United States Patent [19]

Stutzman

[11] Patent Number: 5,271,850
[45] Date of Patent: Dec. 21, 1993

[54] LIQUID FILTRATION WITH FLOW-THROUGH FILTER UNIT

[76] Inventor: Leo W. Stutzman, 617 Lithia Rd., Brandon, Fla. 33511

[21] Appl. No.: 800,228

[22] Filed: Nov. 29, 1991

[51] Int. Cl.⁵ .................. B01D 17/00; B01D 27/10
[52] U.S. Cl. .................. 210/767; 210/437; 210/440; 210/443; 210/456
[58] Field of Search .......... 210/136, 306, 437, 439, 210/441, 443, 456, 767, 318, 337, 440, 488, 489, 444, 445, 450

[56] References Cited

U.S. PATENT DOCUMENTS

| | | | |
|---|---|---|---|
| 563,041 | 6/1896 | Konst | 210/456 |
| 2,354,481 | 7/1944 | Russell | 210/443 |
| 3,633,750 | 1/1972 | Braun et al. | 210/443 |
| 4,017,400 | 4/1977 | Schade | 210/443 |
| 4,366,057 | 12/1982 | Bridges et al. | 210/497.1 |
| 4,579,657 | 4/1986 | Hood | 210/443 |
| 4,751,901 | 6/1988 | Moor | 210/443 |
| 4,773,990 | 9/1988 | Hood | 210/439 |
| 4,780,204 | 12/1988 | Rasmussen | 210/488 |
| 4,792,397 | 12/1988 | Rasmussen | 210/488 |
| 5,022,986 | 6/1991 | Lang | 210/444 |
| 5,110,460 | 5/1992 | Gilas | 210/444 |
| 5,178,753 | 1/1993 | Trabold | 210/440 |

Primary Examiner—Joseph W. Drodge
Attorney, Agent, or Firm—Charles A. McClure

[57] ABSTRACT

Liquid filtration by means of a flow-through filter unit. An open-top housing is adapted to contain a removable filter cartridge having a center bore. Closing the housing with its cover effectively centers the cartridge and also seals both ends of the cartridge to keep unfiltered liquid from bypassing it. A concave baffle below the cartridge reorients the inflow of unfiltered liquid and defines a compartment from which the liquid flows to and enters both ends of the cartridge, flows therein and is filtered, flows radially to the center bore, and axially therefrom to an outlet for filtered liquid.

12 Claims, 3 Drawing Sheets

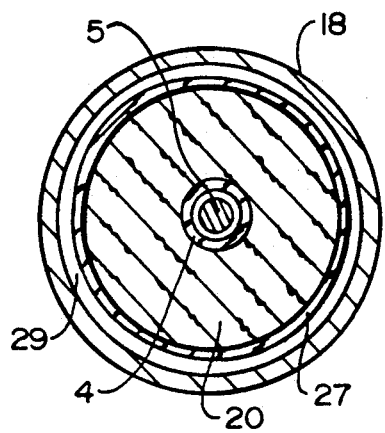 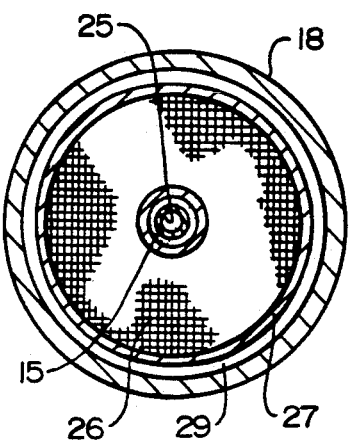 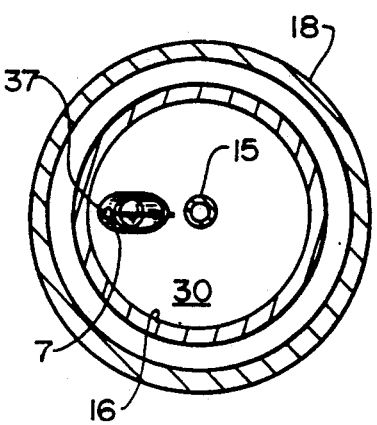
FIG. 4    FIG. 5    FIG. 6
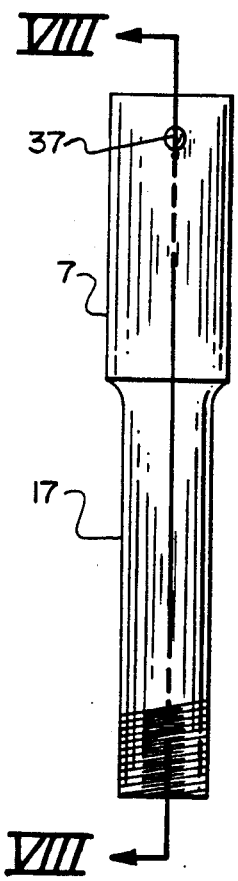 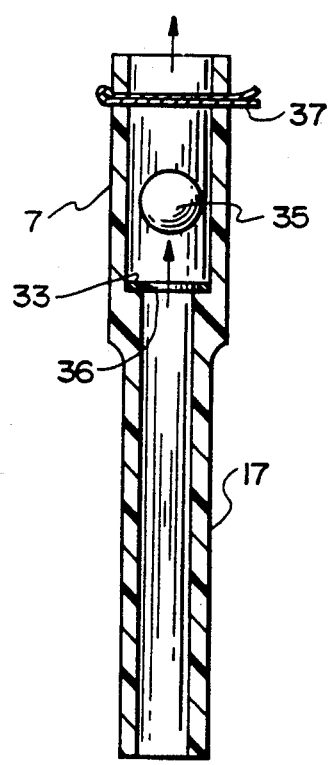 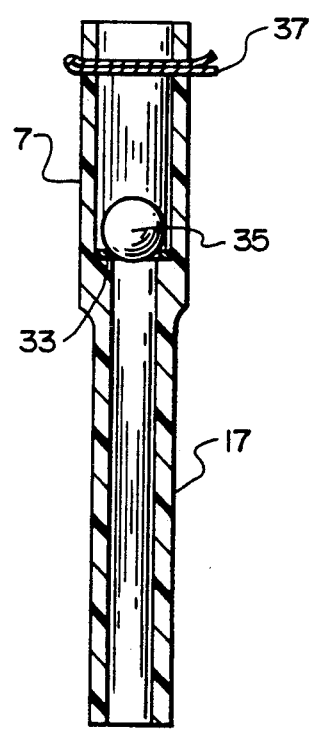
FIG. 7    FIG. 8    FIG. 9

5,271,850

LIQUID FILTRATION WITH FLOW-THROUGH FILTER UNIT

TECHNICAL FIELD

This invention relates to pressurized liquid filtration through a replaceable cylindrical filter of fibrous type, mainly axially, as for separation of water and particulate solids from oily liquids.

BACKGROUND OF THE INVENTION

Cylindrical filtration units, containing replaceable cartridges made of fibrous material through which liquids are circulated under pressure to be cleaned, have been known for many years. Effective filtration depends upon passing all of the liquid through the filter cartridge so as to exclude whatever contamination liquids or solids may be present in the liquid to be filtered. Any liquid bypassing the filter cartridge to an appreciable extent is unlikely to become as clean as liquid traversing a longer path through the filter.

Filters of this general type are disclosed in such U.S. patents as Bridges et al. U.S. Pat. No. 4,366,057, and Rasmussen U.S. Pat. No. 4,780,204 and U.S. Pat. No. 4,792,397. Their filter cartridges are of wound type, variously constructed to enhance the likelihood of axial flow predominating over radial flow.

A need remains for more positive axial flow enhancement and to provide for interim storage of separated water or like contaminant. The present invention is designed to meet these needs.

SUMMARY OF THE INVENTION

A primary object of the present invention is to enhance axial flow of liquid through a cylindrical filtration cartridge.

Another object of this invention is to provide positive sealing of a cylindrical filtration cartridge against bypassing liquid flow.

A further object of the invention is to provide the foregoing features in a cylindrical filtration unit having a housing with an openable end adapted to be closed by a cover, Yet another object is to provide in a cylindrical filter unit a compartment adjoining the filter cartridge to hold separated water.

A still further object is to provide all the foregoing features in a portable filtration unit readily assembled and disassembled.

In general, the objects of this invention are accomplished by passing liquid via an off-axial inlet into a cylindrical housing having an openable end provided with a removable cover and adapted to receive an axially bored replaceable filter cartridge coaxially about an axial outflow pipe extending from an open end within the cartridge bore to an outlet near the inlet, sealing opposite ends of the cartridge respectively to the cover and the axial pipe by means of coaxial cylindrical edges compressed thereinto upon closing the housing by the cover, and enabling the liquid to flow from the inlet to and mainly axially through the filter cartridge on to the outlet.

More particularly, the foregoing objects are accomplished by a filtration unit with a portable cylindrical cuplike housing having an open end adapted to be closed by a cover, a base portion of the housing having an off-axial inflow opening thereinto and a coaxial outflow opening therefrom, and an upstanding sidewall portion adjoining the base portion; a removable cover adapted to close the open end of the housing, and to seal against an end of a filter cartridge when in place within the housing; a coaxial outflow pipe, fitting the outflow opening, and extending longitudinally therefrom through a major part of the housing; a baffle located about the coaxial outflow pipe, defining with the sidewall and the base of the housing member a compartment in a minor part of the housing volume, adapted to permit liquid flow from the inflow opening past the baffle to the filter cartridge; a replaceable filter cartridge having an axial bore, adapted to fit removably around the outflow pipe, and to occupy a major part of the housing volume, between the baffle and the covered housing end. The apparatus of this invention features such a cover carrying a cylindrical stub with a circumferential edge concentric with the axial bore and axially oriented toward an adjacent end of the filter cartridge, and so adapted, when the housing opening is closed by the cover with such a cartridge inside, to press into and seal the stub to the cartridge end, and—concentric with the outflow pipe—a similar stub with a circumferential edge axially oriented toward the first stub and similarly adapted to press into and seal such opposite end to the filter cartridge therebetween.

Other objects of the present invention, together with means and methods for attaining the various objects, will be apparent from the following description and accompanying diagrams of preferred embodiments, which are presented by way of example rather than limitation.

SUMMARY OF THE DRAWINGS

FIG. 4 is a transverse section of the same filtration unit taken along IV—IV on FIG. 3;

FIG. 5 is a like section of the same taken along V—V on FIG. 3;

FIG. 6 is a like section of the same along VI—VI on FIG. 3;

FIG. 7 is a side elevation of the inlet pipe of FIG. 1;

FIG. 8 is a side sectional elevation of the inlet pipe taken along VIII—VIII of FIG. 7 during liquid inflow; and FIG. 9 is a view like FIG. 8 taken in the absence of inflow.

DESCRIPTION OF THE INVENTION

Figure 1:
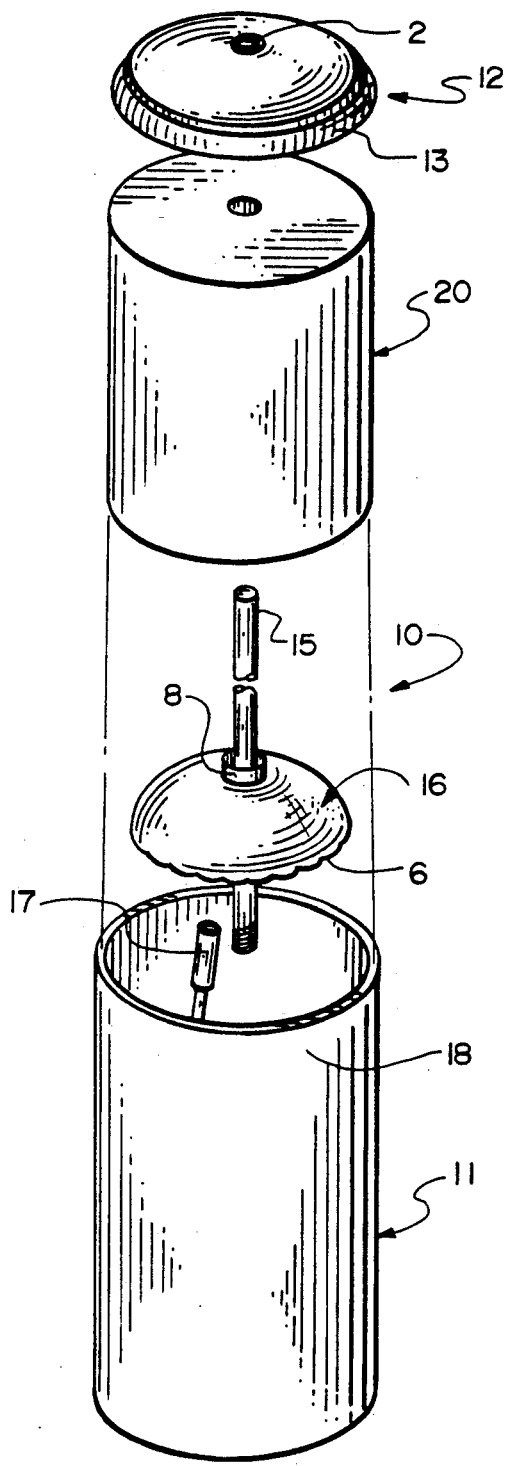
FIG. 1 is an exploded perspective view of a filtration unit of the present invention.

FIG. 1 shows filtration unit 10 of this invention exploded and featuring cylindrical cuplike housing member 11. The housing member has a curved base (19, not visible in this view) upstanding sidewall 18, and an open top, adapted to be closed by domed cover 12, which has at its top axial bore 2 (blinded underneath as described below). Shown just below the cover is cylindrical filter cartridge 20 having axial bore 25 therethrough to receive from below the open end of axially extending outflow pipe 15, partly cut away. Hemispherical baffle 16, with scalloped peripheral bottom edge 6, fits coaxially about the outflow pipe, as does cylindrical stub 8 thereabove. Just visible near the top of the housing sidewall is short off-axial inflow pipe 17—shown somewhat canted.

Figure 2A:
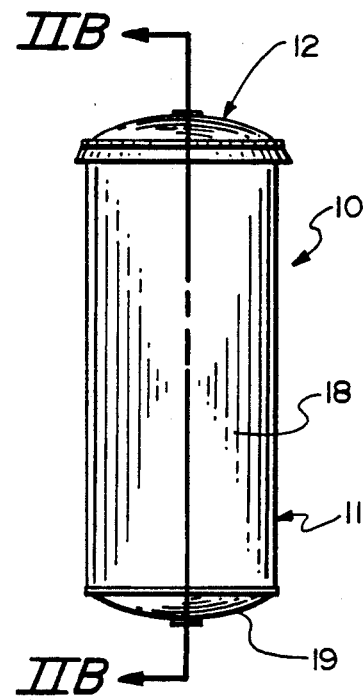
FIG. 2A is a side elevation of the filtration unit assembled.

FIG. 2A shows filtration unit 10 from the side, with cover 12, including peripheral flange 13 extending downward and flaring out skirtlike, assembled to the previously open top of sidewall 18 of housing member 11, whose base 19 is seen in this view to be convex and rather similar to the cover except flangeless and inverted.

Figure 2B:
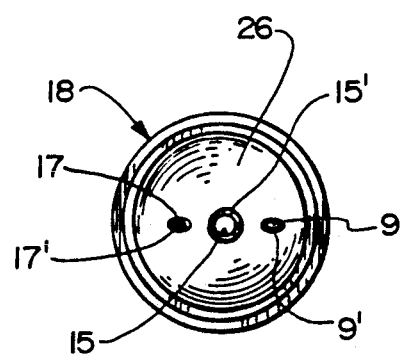
FIG. 2B is a bottom plan of the same filtration unit.

FIG. 2B shows base or bottom 19 of housing member 11, revealing the bottom end of outflow pipe 15 in outlet opening 15' flanked left and right by the bottom end of inflow pipe 17 in intake opening 17' and removable drain plug 9 in opening 9'.

Figure 3:
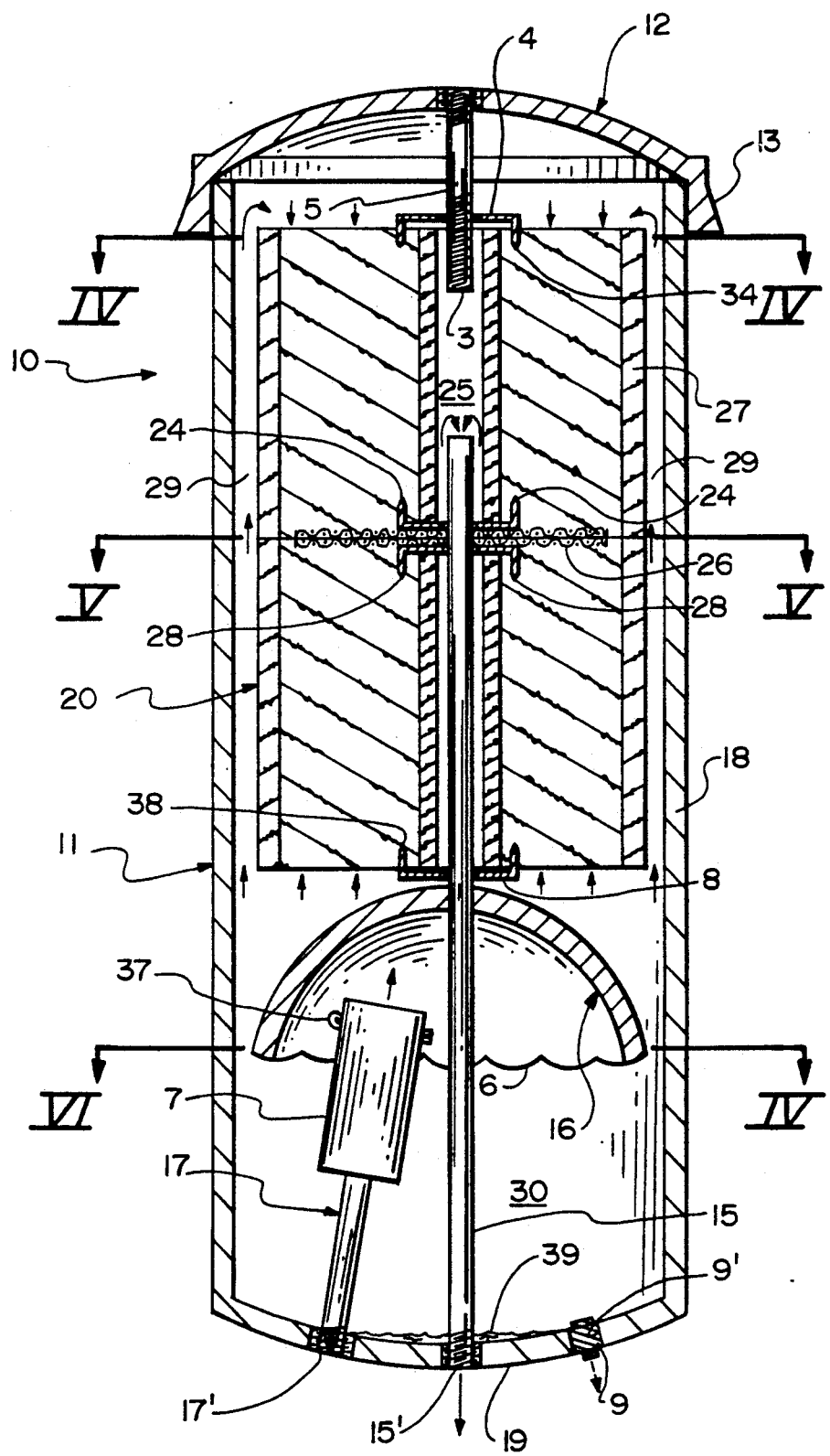
FIG. 3 is an axial section of the same filtration unit, on a larger scale, taken along III—III on FIG. 2.

FIG. 3 shows filtration unit 10 in axial section taken along IIB—IIB on FIG. 2A. Flow arrows in the drawing are self-explanatory and are considered further in description of the filtration unit's operation following commentary about all of the drawing figures.

The housing interior is divided generally into the upper two-thirds or so, occupied mainly by filter cartridge 20, and the lower one-third or so as compartment 30, communicating with the exterior. Visible in compartment 30 are vertical outflow pipe 15 upstanding from axial opening 15, in the center of base 19, inflow pipe 17 (at the lower left) canted according to the curvature of the base with its lower end fitting into opening 17' in the base and with its upper end enlarged as check ball chamber 7 (with cotter pin 37 in it), drain plug 9 (at the lower right) fitting in opening 9' in the base, plus a small quantity of water 39 in the lowest part of the base below the level of the drain opening. The outflow pipe carries hemispherical baffle 16 about it, and extends above the baffle out of compartment 30 into the upper part of the housing and specifically into axial bore 25 within cylindrical filter cartridge 20. The outflow pipe extends therethrough for a major part (e.g., three quarters) of the bore length.

Cover 12 includes, besides its peripheral skirted flange 13, axial centering pin 5 fitting within bore 25 of the cartridge, and coaxial cylindrical stub 4 carried adjustably on threaded bottom end 3 of the pin, with circular edge 34 of the stub protruding downward into indented sealing contact with the top surface of cartridge 20. Below cartridge 20, coaxial cylindrical stub 8 (a mirror image of upper stub 4) is carried by outflow pipe 15 just above baffle 16 and compartment 30, with circular edge 38 of the stub protruding upward into indented sealing contact with the bottom of the cartridge.

As noted, filter cartridge 20 occupies most of the upper two-thirds or so of the housing interior. The cartridge embodiment shown here is of preferred "dual" type, comprising a pair of similar cylindrical halves, each having a body composed of numerous layers of tissue 21 wrapped tightly onto and around rigid hollow core 24 and extending to dense fibrous peripheral jacket 27. The respective filter halves are separated midway of the axially longitudinal extent of the cartridge by wide-mesh horizontal screen 26 extending radially outward from cartridge bore 25 to jacket 27 of each. Flanking the axially adjacent portion of the screen above and below are adjacent end caps 24 and 28, each with a flat horizontal flange open in line with the cartridge bore, contiguous with the screen and having a stubby integral coaxial flange indented into the cartridge material, maintaining the screen flat and discouraging deformation of the cartridge from possibly excessive pressure radially inward.

As indicated by section line IV—IV at about the level of the top of filter cartridge 20, section line V—V midway of the cartridge, and section VI—VI at about the level of the baffle just below the top end of ball chamber 7, FIGS. 4, 5, and 6 show transverse sections through the filter unit at those respective levels.

FIG. 4 shows, starting at the axis and circling outward, centering pin 5, coaxial sealing stub 4, filter cartridge 20, clearance 29, and housing sidewall 18. The removable cartridge is spaced from the sidewall by clearance 29 sufficiently for axial flow of liquid from the lower compartment to pass by on its way toward entering the top of the cartridge, and to enable the cartridge to be inserted into, and be removed from, the housing with reasonable facility.

FIG. 5 shows, in like order, coaxial outflow pipe 15, cartridge bore 25, screen 26 extending radially from the edge of the bore to a circular outer edge surrounded by outermost layer 27 of the cartridge, clearance 29, and sidewall 18.

FIG. 6 shows, likewise, coaxial outflow pipe 15 at the center, an outer part of baffle 16, check ball chamber 7 (below the cotter pin shown previously), and housing sidewall 18.

FIGS. 7, 8, and 9 show, in enlarged side elevation and in axial sectional elevation (two views), inflow pipe 17 and check ball chamber 7 carried thereon as an extension thereof, oriented vertically for convenience in representation.

FIG. 7 shows, from the side, inflow pipe 17, threaded at its lower end and thereby adapted to fit into complementary opening 17' (shown previously) in the housing base. Extending upward from the inflow pipe is chamber 7 widened to accommodate a check ball inside, as shown in FIGS. 8 and 9, and with cotter pin 37 extending through.

FIG. 8 shows inflow pipe 17 in axial section and check ball chamber 7 sectioned as indicated in FIG. 7. Arrows at the top and bottom indicate that liquid is flowing into the bottom end of inflow pipe 17 and flowing out from the top of check ball chamber 7. An intermediate arrow points toward check ball 35 inside, shown raised by the liquid flow above O-ring 34 provided as a valve seat at the junction of smaller and larger diameters.

FIG. 9 is similar to FIG. 8 but showing check ball 35 resting on the valve seat in the absence (no arrows) of such liquid flow.

Operation of the described apparatus embodiment of this invention is readily apparent in the light of the foregoing description and the accompanying diagrams, including the appended arrows. Oily liquid to cleaned enters the housing inlet at the lower left, passes into and through the inflow pipe, into and through the check ball chamber, raising the check ball from its seat, and enters into the largely vacant lower compartment, where it impinges onto the concave lower surface of the baffle and has its flow reoriented. Water present in the entering oily liquid tends to separate from the flow and drop to the bottom, where it collects until the unit is drained.

Some of the liquid, after flowing around the scalloped skirt of the baffle, enters directly into the lower surface of the filter cartridge and proceeds upward, while the rest of the liquid flows through the clearance between the outer surface of the cartridge and the inner surface of the housing sidewall and into the space under the cover, from which it enters the upper surface of the filter cartridge and proceeds downward. Liquid flowing along such opposite paths within the cartridge joins at the wide-mesh screen and turns radially inward along the screen until reaching the cartridge bore, where the combined flow turns vertical along the outside of the outflow pipe until reaching the end of the pipe, which it enters and—now much cleaner—flows through and out of the filtration unit.

It will be understood that, if the oily liquid could bypass the filter cartridge, some of the liquid might leave the filtration unit as contaminated as when it entered. Edge seals, such as O-rings and other flexible inserts customarily fatigue with use, so that even if they are effective when first installed (doubtful at best) soon they begin to leak, and the filtration is partially bypassed, resulting in an incompletely filtered product. Bypassing is precluded in the apparatus of this invention by squeezing the filter cartridge from top and bottom between circular stub edges to indent the cartridge faces so tightly that no liquid can flow radially to the axial bore or the outflow pipe without proceeding axially through one half of the dual cartridge. The impermeable inner core and the surrounding tightly wound tissue of the cartridge ensure that liquid within the cartridge will flow mainly axially between, rather than radially through, its adjacent fibrous layers.

As shown here, the upper sealing stub is adjustable to vary the distance between it and the fixed lower sealing stub to compensate for minor variation in length of filter cartridges. Of course, the lower sealing stub could be made similarly adjustable, if desired, instead of or in addition to the upper sealing stub. However, as the cover is handled anyway when a used cartridge is being replaced by a new one, and as the top edge of the cartridge is visible, the top adjustment usually suffices. It will be understood that the act of putting the cover on compresses the filter cartridge above and below by and between the stubs, and the proper degree of compression to effect a good long-lasting seal is readily ascertainable by feel, with only a modicum of practice and without undue experimentation.

Prominent uses for filtration units of this invention include fuel filtration for diesel engines, lubricating oil filtration for internal combustion engines generally, and filtration of numerous non-aqueous chemical liquids, such as vegetable oils used in foods.

The apparatus usually is sufficiently portable that it can be carried to and from temporary jobs and small enough to be readily installed permanently, such as in-line on a stationary engine. More conveniently for temporary uses, the apparatus may be mounted on a dolly or like device and be wheeled to the place of its intended use and be removed similarly upon completion of the filtration job(s).

The apparatus of this invention does not require any unusual materials. The housing and the cover are preferably steel or equivalent metal capable of withstanding the pressure required to force liquid to be filtered through the filter unit. Such pressures are moderate, not exceed several atmospheres, at appropriate throughput rates such as several gallons per minute, and impose no undue stress on the apparatus. Excessive filtration rates are to be avoided as possibly conducive to channeling or other less than optimal filtering condition as well as because of possible cartridge degradation.

Commercial suppliers of filter cartridges suitable for use in the apparatus and process of this invention include Harvard Corporation, of Evansville, Wis. and Como Corporation of Janesville, Wis. Other commercially available cartridges of single, dual, or other multiple type, or other source, may be used, if desired.

The wide-mesh screen in the dual type of filter may be made of metallic wire and may comprise multiple layers. Alternative structures may be substituted to assure the desired radial flow.

The cover of the filtration unit may be made to be threaded or clamped onto the top of a housing sidewall, whichever is preferred.

Other modifications may be made, as by adding, combining, deleting, or subdividing compositions, parts, or steps, while retaining at least some of the many advantages and benefits of the present invention—which itself is defined in the following claims.

I claim:

1. Liquid filtration unit, comprising
   a cylindrical housing having an open end adapted to be closed by a cover, and a side wall portion upstanding from a cuplike base portion, having an off-axial inlet opening to receive unfiltered liquid and a coaxial outlet opening to discharge filtered liquid,
   a removable cover adapted to close the open end of the housing;
   a coaxial outflow pipe, fitting the outflow opening, and extending longitudinally therefrom through a major part of the housing;
   adapted to receive removably a replaceable filter cartridge to occupy a major part of the housing volume, with the outflow pipe fitting within a major part of an axial bore through the cartridge; and
   a baffle located about the coaxial outflow pipe, defining with the sidewall and the base of the housing member a compartment in a minor part of the housing volume, but adapted to permit liquid flow from the inflow opening past the baffle to the filter cartridge,
   wherein the filter cartridge has a radially extending separator midway of its ends comprising a mesh structure extending from the cartridge bore toward but not reaching the cartridge peripheral surface and adapted to facilitate radial flow inward toward the outflow pipe for liquid already having flowed axially through the filter cartridge.

2. Liquid filtration unit according to claim 1, wherein the filter cartridge comprises fibrous material layered substantially circumferentially.

3. In a liquid filtration unit having a housing with an open end adapted to be closed by a cover and adapted to receive therein a substantially cylindrical replaceable filter cartridge having an axial bore therethrough,
   the improvement comprising a housing cover carrying cylindrical means with a circumferential edge concentric with but larger in diameter than the axial bore and oriented toward an adjacent end of a filter cartridge when therein,
   being so adapted, when the housing opening is closed by the cover with a said cartridge inside, to surround the bore and be spaced radially thereabout and adapted also to press into the adjacent cartridge end surrounding the bore without intruding into the bore, and so preclude axial flow thereinto at that end; and
   an axial outflow pipe adapted to extend into the bore from the opposite end of a said filter cartridge when therein, and carrying concentric therewith a circumferential edge exceeding the bore in diameter oriented toward that opposite end of a said filter cartridge when therein, being so adapted, when the housing opening is closed by the cover with a said cartridge inside, to press into that end likewise and thus seal that cartridge end.

4. Liquid filtration unit improvement according to claim 3, including a baffle, adjacent said opposite end of said filter cartridge, when therein, and defining with the housing a compartment having an inlet for inflowing liquid to be filtered, and adapted to redirect the flow of said liquid before passing from the compartment to the cartridge location; and including also a coaxial outflow pipe extending from the bore of the filter cartridge, when therein, past the baffle to an outlet, located in the compartment, for filtered liquid leaving the housing.

5. Liquid filtration unit improvement according to claim 4, wherein the baffle is concave toward the inlet for inflowing liquid.

6. Method of liquid filtration, comprising the steps of passing liquid via an off-axial inlet opening into a generally cylindrical housing having an open end provided with a removable cover and adapted to receive an axially bored replaceable filter cartridge coaxially about an axial outflow pipe extending from within the cartridge bore to an outlet opening from the housing, sealing opposite ends of the cartridge to the cover and the axial pipe respectively by means of coaxial cylindrical edges pressed thereinto outside the cartridge axial bore upon closing the housing by the cover, and enabling the liquid to flow from the inlet to and mainly axially through the filter cartridge, then radially to the outflow pipe, and axially therethrough to and out from the outlet opening.

7. Liquid filtration method according to claim 6, including the steps of providing a compartment, apart from the filter cartridge when in place within the housing, located between the filter cartridge and the inlet and outlet openings, into which liquid flows via the inlet opening and from which liquid flows out via the outflow pipe fitted into the outlet opening, redirecting the flow of liquid from the compartment to the filter cartridge by inserting a baffle therebetween concave toward the inlet opening and convex toward the filter cartridge effective to impede and thereby redirect the flow without precluding such flow.

8. Liquid filtration method according to claim 7, including the step of draining separated water from the compartment when liquid is not flowing through said filter.

9. Liquid filtered according to the method of claim 6.

10. Liquid filtration unit, comprising a cylindrical housing having an open end adapted to be closed by a cover, and a sidewall portion upstanding from a cuplike opposite end portion, having an off-axial inlet opening to receive unfiltered liquid and a coaxial outlet opening to discharge filtered liquid, a removable cover adapted to close the open end of the housing;

a coaxial outflow pipe, fitting the outlet opening, and extending longitudinally therefrom through a major part of the housing;

adapted to receive removably a replaceable cylindrical filter cartridge to occupy a major part of the housing volume, with the outflow pipe fitting within a major part of an axial bore through the cartridge; and at each of opposite ends of the cartridge bore, a closed cylindrical stub open at one end and concentric with the bore but having a diameter greater than the bore and with its open end juxtaposable to the end of the cartridge and adapted to press into the adjacent end of the cartridge when the cover is in place and thereby seal off the bore without intruding into it.

11. Liquid filtration unit according to claim 10, wherein the cover includes a center pin adapted to fit into the axial bore of the filter cartridge, and the cylindrical stub with its circular edge oriented away from the cover and adapted to press into and thus seal off the adjacent upper end of the filter cartridge.

12. Method of liquid filtration, comprising the steps of providing a cylindrical housing having one end closed except for liquid inlet and outlet openings, having therein an axial pipe to an outlet opening, and having its opposite end adapted to be uncovered temporarily to receive therein a removable filter cartridge of similar but smaller shape with an axial bore therethrough adapted to fit on the axial pipe spaced from the closed end of the housing;

providing a generally hemispherical baffle, also fitting on the pipe, oriented with its convex surface toward the filter cartridge when present, with its rim spaced from the housing wall sufficiently to allow liquid to be filtered to flow around the rim of the baffle and toward the filter cartridge, and with its concave surface toward the inlet opening for unfiltered liquid;

passing liquid via an inlet opening into the housing and toward the concave surface of the baffle to be redirected thereby, past the rim of the baffle toward and through the filter cartridge, when therein, into the bore of the cartridge and axially therein to and through the outlet pipe to the exterior of the cylindrical housing;

providing on the cover and also on the axial pipe to the outlet opening respective cylindrical stub means having an inside diameter larger than the diameter of the axial bore of the filter cartridge and adapted, when the uncovered housing with a filter cartridge inside is being recovered with the cover, to press into the respective ends of the cartridge about but spaced from the cartridge bore; and uncovering the opposite end of the housing, inserting a filter cartridge into the housing with the cartridge bore fitting onto the axial pipe, and recovering the end of the housing;

thereby pressing the stubs into the ends of the cartridge and precluding the liquid to be filtered from entering the cartridge bore until having passed through some part of the cartridge.

* * * * *